(12) United States Patent
Hartmann et al.

(10) Patent No.: US 11,072,224 B2
(45) Date of Patent: Jul. 27, 2021

(54) AUXILIARY HEATING SYSTEM

(71) Applicant: AUDI AG, Ingolstadt (DE)

(72) Inventors: Matthias Hartmann, Kösching (DE);
Nico Schobeß, Gaimersheim (DE);
Mohamed Hammam, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 130 days.

(21) Appl. No.: 16/032,391

(22) Filed: Jul. 11, 2018

(65) Prior Publication Data
US 2019/0016194 A1    Jan. 17, 2019

(30) Foreign Application Priority Data
Jul. 17, 2017  (DE) .......................... 102017212191.2

(51) Int. Cl.
| | | |
|---|---|---|
| *B60H 1/14* | (2006.01) | |
| *B60H 1/04* | (2006.01) | |
| *B60H 1/00* | (2006.01) | |
| *H02P 29/68* | (2016.01) | |
| *B60H 1/22* | (2006.01) | |
| *H02P 29/64* | (2016.01) | |
| *B60W 20/00* | (2016.01) | |
| *H02P 29/62* | (2016.01) | |

(52) U.S. Cl.
CPC .......... *B60H 1/143* (2013.01); *B60H 1/004* (2013.01); *B60H 1/00392* (2013.01); *B60H 1/04* (2013.01); *B60H 1/2218* (2013.01); *B60W 20/00* (2013.01); *H02P 29/62* (2016.02); *H02P 29/64* (2016.02); *H02P 29/68* (2016.02); *B60H 2001/00307* (2013.01); *B60H 2001/2234* (2013.01)

(58) Field of Classification Search
None
See application file for complete search history.

(56) References Cited

U.S. PATENT DOCUMENTS

| | | | | |
|---|---|---|---|---|
| 8,989,932 | B2* | 3/2015 | Shono ............... | H02K 9/19 |
| | | | | 701/22 |
| 9,694,688 | B2* | 7/2017 | Oyama ............... | B60L 3/0076 |
| 2004/0154573 | A1 | 8/2004 | Reutlinger | |
| 2007/0233351 | A1* | 10/2007 | Wang ............... | B60T 7/122 |
| | | | | 701/70 |
| 2009/0118947 | A1* | 5/2009 | Heap ............... | B60W 10/08 |
| | | | | 701/55 |
| 2009/0118963 | A1* | 5/2009 | Heap ............... | B60W 20/15 |
| | | | | 701/99 |

(Continued)

FOREIGN PATENT DOCUMENTS

| | | | | |
|---|---|---|---|---|
| CN | 102281025 A | * | 12/2011 | ............ B60L 3/003 |
| CN | 102852619 A | | 1/2013 | |

(Continued)

OTHER PUBLICATIONS

"16032391_2020-12-21_CN_205423013_U_M.pdf", Derwent #201656 (2016-48972X)—CN-205423013-U. (Year: 2016).*

(Continued)

*Primary Examiner* — Daniel E. Namay
(74) *Attorney, Agent, or Firm* — Maier & Maier, PLLC

(57) ABSTRACT

An auxiliary heating system for motor vehicles driven by electric motors and a method for realizing an auxiliary heating function in a motor vehicle having an electric drivetrain.

15 Claims, 1 Drawing Sheet

(56) References Cited

U.S. PATENT DOCUMENTS

| | | | | |
|---|---|---|---|---|
| 2010/0108032 | A1* | 5/2010 | Pursifull | B60W 10/08 |
| | | | | 123/406.12 |
| 2011/0279074 | A1* | 11/2011 | Yeh | G01K 13/08 |
| | | | | 318/432 |
| 2013/0040219 | A1* | 2/2013 | Naganuma | H01M 8/04992 |
| | | | | 429/429 |
| 2013/0079963 | A1* | 3/2013 | Shono | H02K 9/19 |
| | | | | 701/22 |
| 2013/0080027 | A1* | 3/2013 | Mikawa | F02D 41/009 |
| | | | | 701/102 |
| 2014/0216682 | A1* | 8/2014 | Cherouat | B60K 11/02 |
| | | | | 165/11.1 |
| 2015/0202966 | A1* | 7/2015 | Oyama | B60L 3/0076 |
| | | | | 701/22 |
| 2017/0036546 | A1* | 2/2017 | Schedel | H02P 29/60 |
| 2018/0009320 | A1* | 1/2018 | Johansson | B60L 53/11 |
| 2018/0037086 | A1* | 2/2018 | Nicgorski | B60H 1/00278 |
| 2018/0050605 | A1* | 2/2018 | Lewis | B60H 1/03 |
| 2018/0097266 | A1* | 4/2018 | Jalilevand | B60L 1/02 |
| 2018/0162377 | A1* | 6/2018 | Colavincenzo | B60K 6/387 |
| 2018/0257666 | A1* | 9/2018 | Bryan | B60H 1/00385 |
| 2019/0039433 | A1* | 2/2019 | Wakisaka | B60H 1/00864 |
| 2019/0047360 | A1* | 2/2019 | Kishita | B60H 1/00328 |
| 2019/0152294 | A1* | 5/2019 | Peng | B60H 1/00278 |
| 2019/0202258 | A1* | 7/2019 | Peng | B60H 1/00 |
| 2019/0210425 | A1* | 7/2019 | Azzouz | B60H 1/00914 |

FOREIGN PATENT DOCUMENTS

| | | | | |
|---|---|---|---|---|
| CN | 110733323 A | * | 1/2020 | |
| DE | 196 49 710 A1 | | 6/1998 | |
| DE | 102 01 755 A1 | | 7/2003 | |
| DE | 10 2009 023 175 A1 | | 12/2010 | |
| DE | 102009023175 A1 | * | 12/2010 | B60H 1/00392 |
| DE | 102009028330 A1 | | 2/2011 | |
| DE | 10 2011 004 624 A1 | | 8/2012 | |
| DE | 10 2011 100 685 A1 | | 11/2012 | |
| DE | 10 2012 208 419 A1 | | 11/2013 | |
| DE | 10 2013 105 747 A1 | | 1/2014 | |
| DE | 102012215585 A1 | * | 3/2014 | B60L 3/003 |
| DE | 102014112201 A1 | | 3/2016 | |
| EP | 2532544 A1 | * | 12/2012 | B60H 1/00278 |
| EP | 2556983 A1 | | 2/2013 | |
| WO | 03/060296 A1 | | 7/2003 | |
| WO | WO-03060296 A1 | * | 7/2003 | F01P 3/20 |
| WO | 2012/113583 A1 | | 8/2012 | |
| WO | 2014/034333 A1 | | 3/2014 | |

OTHER PUBLICATIONS

German Office Action dated Oct. 2, 2019, in connection with corresponding DE Application No. 10 2017 212 191.2 (11 pgs., including machine-generated English translation).

Search Report dated Dec. 13, 2018 of corresponding European application No. 18181097.9; 12 pages including Partial Machine-generated English-language translation.

Examination Report dated Jun. 3, 2020, in corresponding European patent application No. 18181097.9 including partial machine-generated English language translation, 7 pages.

Chinese Office Action dated May 7, 2021, in connection with corresponding CN Application No. 201810775481.1 (14pp., including machine-generated English translation).

* cited by examiner

AUXILIARY HEATING SYSTEM

FIELD

The invention relates to an auxiliary heating system for motor vehicles driven by electric motors and a method for realizing an auxiliary heating function in a motor vehicle having an electric drivetrain.

BACKGROUND

The auxiliary heating function is offered as optional equipment for motor vehicles having an internal combustion engine. For this function, for example, fuel is combusted in hardware installed for this very purpose and the vehicle interior and the internal combustion engine of the vehicle are heated using the heat produced. However, the required additional hardware leads to additional costs, a heavier weight, and a greater packing space requirement.

Various alternatives to conventional auxiliary heating systems that can be utilized in electric or hybrid vehicles have already been proposed.

Known from DE 10 2014 112 201 A1 is a method and a device for controlling a waste heat management of a vehicle. In this case, waste heat produced by electronic components of a hybrid vehicle is used for an auxiliary heating system of the hybrid vehicle.

DE 10 2009 028 330 A1 discloses a method and a device for adjusting the temperature of a vehicle interior, in which the interior is heated by way of the waste heat of a charging device for charging a vehicle battery of a hybrid vehicle or by way of the waste heat of the vehicle battery.

Disclosed in EP 2 556 983 A1 is a method for recharging a rechargeable battery with the aid of an energy recovery system as well as a drive unit for an electric or hybrid vehicle. A part of the electric energy generated by means of energy recovery is converted into useful heat for an auxiliary heating system.

SUMMARY

The object of the invention includes in making available an alternative auxiliary heating system for motor vehicles that have an electric drivetrain, for which no additional heating components, such as, for example, burners or heating resistors, are required.

The object was achieved in that the auxiliary heating function is assumed by an electric motor. In vehicles with an electric drivetrain, electric motors of adequate power are installed and, in any case, are connected to the cooling water system. According to the invention, in contrast to normal operation, the power loss or dissipation is maximized during operation of the electric machine and the resulting torque is minimized.

The subject of the invention is an auxiliary heating system for a motor vehicle with an electric drivetrain. The auxiliary heating system comprises at least one electric motor, which is connected to a coolant circulation of the motor vehicle, a power dissipation monitor, which is equipped to determine an actual value of the power dissipation $P_{VActual}$ of the electric motor, and a power dissipation regulator, which is equipped to regulate the power dissipation $P_V$ of the electric motor to a desired value $P_{VDesired}$. In one embodiment, the actual value $P_{VActual}$ is determined in a power dissipation monitor via a model-based approach by using motor and power stage parameters, wherein measured or estimated temperatures in the stator and/or inverter of the electric motor, volume flows in the coolant circulation, and the measured currents of the regulation can be used.

In one embodiment, therefore, the power dissipation monitor is equipped to process parameters of the electric motor and of the power stage and/or measured or estimated temperatures in the stator and/or in the pulse converter (inverter) of the electric motor and/or volume flows in the coolant circulation and/or currents measured in the electric power circuit regulated by the power dissipation regulator.

In one embodiment, the auxiliary heating system further comprises a lookup table, a field-oriented drive control, a modulation unit, and a power stage. In one embodiment, via the lookup table of a modulation unit and of a downstream power stage, currents are specified in such a way that, corresponding to the starting value of the power dissipation regulator, maximum dissipations or losses occur.

In one embodiment, the motor vehicle is a battery electric vehicle (BEV). In another embodiment, the motor vehicle comprises at least one internal combustion engine. In another embodiment, the motor vehicle is a plug-in hybrid vehicle (PHEV), a hybrid electric vehicle (HEV), or a mild hybrid electric vehicle (MHEV). In one embodiment, the auxiliary heating system according to the invention is connected to a coolant circulation of an internal combustion engine of the motor vehicle.

The subject of the invention is also a method for heating a coolant in a coolant circulation of a motor vehicle that has an electric drivetrain that comprises at least one electric motor connected to the coolant circulation. The method comprises the operation of at least one electric motor at an operating point at which the power dissipation of the electric motor is maximized and the resulting torque of the electric motor is minimized. The heat thereby created is drawn off via the coolant circulation and heats the coolant.

In one embodiment of the method, the heated coolant is utilized for heating the passenger compartment of the motor vehicle. In another embodiment of the method, the heated coolant is utilized for preheating an internal combustion engine of the motor vehicle. In one embodiment, the heated coolant is utilized both for heating the passenger compartment as well as for preheating an internal combustion engine.

Characteristic of the method according to the invention is that, via the drive (electric motor and inverter), a vehicle is heated by maximizing the electric losses, wherein no undesired additional torque is produced, no additional heating components (e.g., heating resistors) are required, and the heating function is possible in operation at standstill or in running operation.

An electric motor with an inverter is utilized, which is present in the motor vehicle and, as a rule, is connected in any case to the coolant circulation. During the operation of the electric machine, in contrast to during normal operation when driving, the dissipation is maximized and the resulting torque is minimized. By way of the conversion of electric energy to heat by way of the drive (electric motor and inverter), the vehicle and/or the passenger compartment is/are heated.

For the function of the auxiliary heating system, the electric motor is operated at a very unconventional operating point with maximum or predeterminable power dissipations. In this case, by way of the pulse converter (inverter), current is thereby applied to the windings of the electric motor, and, via the ohmic losses in the winding and the switching and throughput losses in the pulse converter, leads to the desired heating. This heat is dissipated by way of the coolant circulation and can heat the internal combustion engine and, at the same time, the passenger compartment. Cooling systems of electric drives can draw off approximately 10% of the rated power of an electric drive.

The advantages of the invention include savings in costs, weight, and packing space for the auxiliary heating system function. At the same time, the installation rate can be increased from a few percent to 100%, because no additional hardware is needed. Thus, as needed, the auxiliary heating function can be made available in all models of a vehicle model series ("function on demand").

For all vehicles, the auxiliary heating system makes possible a preconditioning of the passenger compartment, leading to an increase in comfort and, at low temperatures, also to a gain in safety owing to a clear view. In the event of frost, it is not necessary to scrape the windows, thereby additionally saving time.

For vehicles with an internal combustion engine, it is possible to precondition the internal combustion engine with the auxiliary heating system. In this way, the service life of the combustion unit is increased, because cold starts are avoided. Thanks to the preheating of the internal combustion engine, the fuel consumption is lowered and emissions are reduced in comparison to a cold start.

It is understood that the features mentioned above and the features still to be explained below can be used not only in the respectively given combination, but also in other combinations or alone, without leaving the scope of the present invention.

BRIEF DESCRIPTION OF THE DRAWINGS

The invention is illustrated schematically in the drawings on the basis of embodiments and will be further described with reference to the drawings. Shown are.

DETAILED DESCRIPTION

Figure 1:
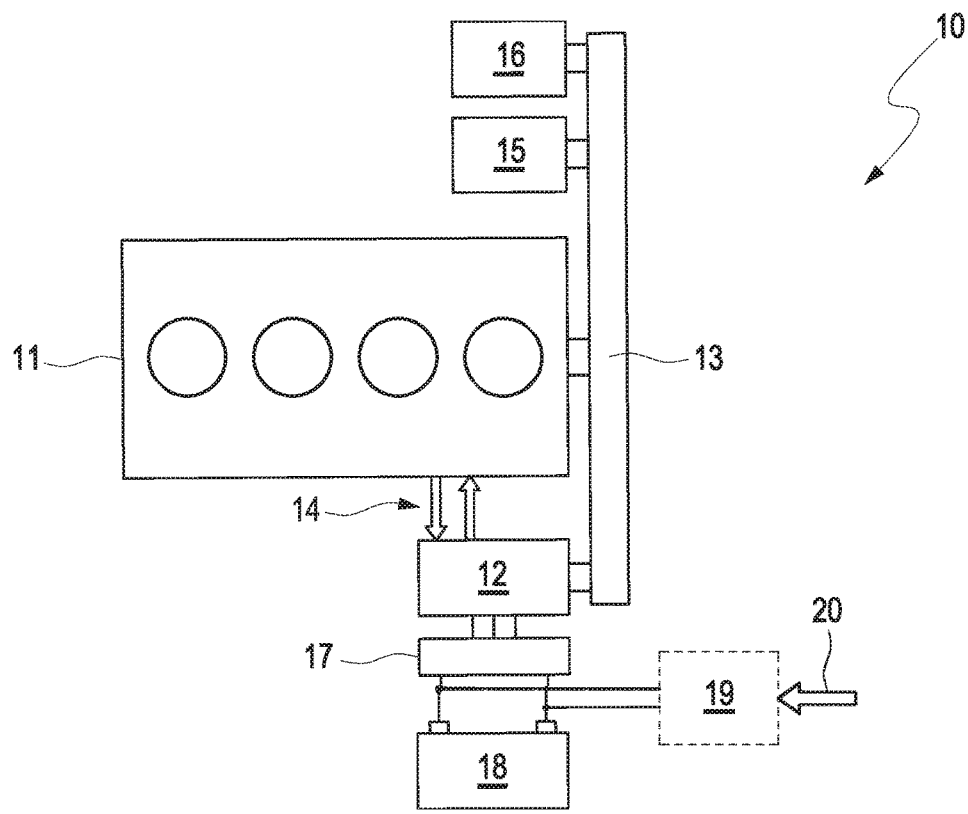
FIG. 1 a schematic illustration of an exemplary embodiment of a drive system of a hybrid vehicle.

FIG. 1 shows schematically an embodiment of a drive system 10 of a hybrid vehicle that has an internal combustion engine 11 and an electric motor 12, which are linked via a belt drive 13 and are connected to a common coolant circulation 14. An air conditioning unit 15 and a cooling water pump 16 are also connected to the belt drive 13. The electric motor 12 is connected via an inverter 17 to a battery 18. Via a charging unit 19, an energy supply 20 from outside is possible. The electric motor 12 can be utilized for the purpose of heating the coolant in the coolant circulation 14 and of heating the internal combustion engine 11 and the passenger compartment.

Figure 2:
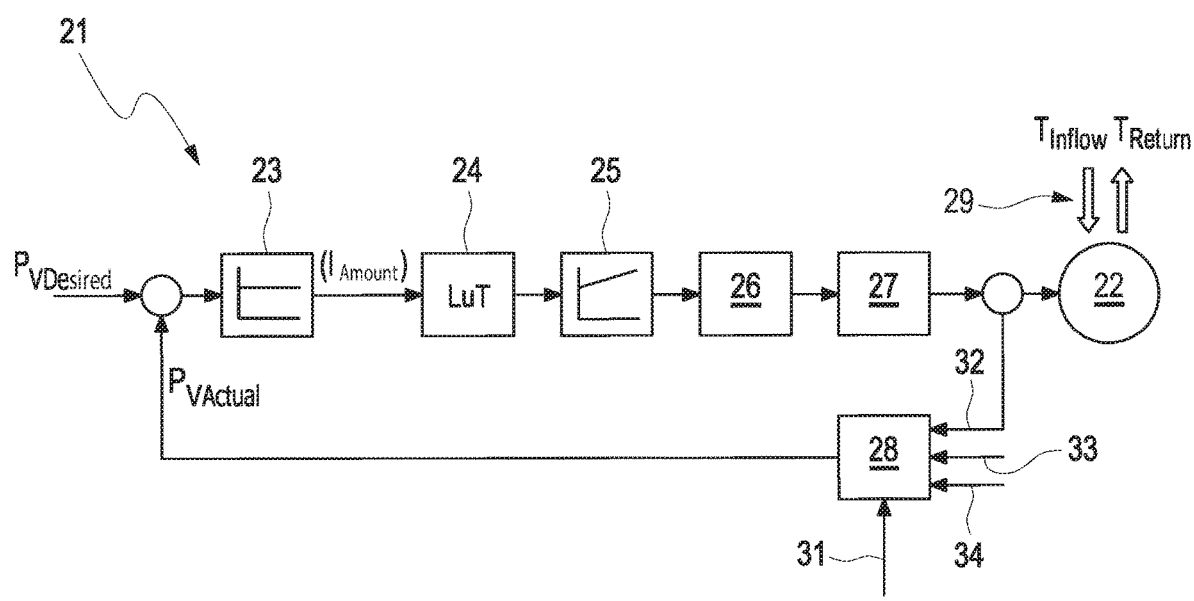
FIG. 2 a schematic illustration of an embodiment of the auxiliary heating system according to the invention.

In FIG. 2, an exemplary implementation of an auxiliary heating system 21 is illustrated. In this case, the power dissipation $P_V$ of an electric motor 22 is regulated via a regulating unit 23 to the desired value $P_{VDesired}$. The power dissipation produced in the electric motor 22 heats the coolant in the coolant circulation 29 from an inflow temperature $T_{Inflow}$ to a return temperature $T_{Return}$. The actual value $P_{VIst}$ is determined in a power dissipation monitor 28 via a model-based approach by using motor and power stage parameters 31, wherein measured or estimated
- temperatures 32 in the stator and/or pulse converter,
- volume flows 33 in the coolant flow, and
- the measured currents 34 of the regulation can be used. By way of a table 24, the flows are specified to a modulation unit 26 and a downstream power stage 27 in such a way that, corresponding to the starting value of the power dissipation regulator 23, maximum dissipations occur. This can be achieved, for example, by a positive or negative d-current (flow-forming without torque contribution). Said currents are adjusted via a conventional field-oriented drive control (PI current regulator 25).

This embodiment has the advantage that the function of the auxiliary heating system can also be maintained during driving operation. The illustrated specific implementation describes a possible implementation variant. According to the invention, it is also possible to choose other structures for the specified desired current.

The invention claimed is:

1. An auxiliary heating system for a motor vehicle having an electric drivetrain, comprising:
at least one electric motor, which is connected to a coolant circulation of the motor vehicle, a power dissipation monitor, which is equipped to determine an actual value of the power dissipation of the electric motor, and a power dissipation regulator, which is equipped to regulate the power dissipation PV of the electric motor to a desired value; and
a power stage;
wherein the power dissipation monitor is equipped to process parameters of volume flows in the coolant circulation and one or more of: the electric motor and of the power stage; measured or estimated temperatures in one or both of the stator and pulse converter of the electric motor; and currents measured in the electric circuit regulated by the power dissipation regulator.

2. The auxiliary heating system according to claim 1, further comprising:
a lookup table, a field-oriented drive control, and a modulation unit, wherein, via a lookup table of the modulation unit and via the power stage, currents are specified in such a way that, corresponding to a starting value of the power dissipation regulator, maximum power dissipations occur.

3. The auxiliary heating system according to claim 1, wherein the motor vehicle is a battery electric vehicle.

4. The auxiliary heating system according to claim 1, wherein the motor vehicle comprises at least one internal combustion engine.

5. The auxiliary heating system according to claim 4, wherein the motor vehicle is a plug-in hybrid vehicle, a hybrid electric vehicle, or a mild hybrid electric vehicle.

6. The auxiliary heating system according to claim 4, wherein the auxiliary heating system is connected to a coolant circulation of an internal combustion engine of the motor vehicle.

7. A method for heating a coolant in a coolant circulation of a motor vehicle having an electric drivetrain, which comprises at least one electric motor, which is connected to the coolant circulation, comprising:
operating the electric motor at an operating point at which the power dissipation of the electric motor is maximized and the resulting torque of the electric motor is minimized, and the heat thereby produced is drawn off by way of the coolant circulation.

8. The method according to claim 7, wherein the heated coolant is utilized for heating the passenger compartment of the motor vehicle.

9. The method according to claim 7, wherein the heated coolant is utilized for preheating an internal combustion engine of the motor vehicle.

10. An auxiliary heating system for a motor vehicle having an electric drivetrain, comprising:
- at least one electric motor, which is connected to a coolant circulation of the motor vehicle, a power dissipation monitor, which is equipped to determine an actual value of the power dissipation of the electric motor, and a power dissipation regulator, which is equipped to regulate the power dissipation PV of the electric motor to a desired value; and
- a power stage, a lookup table, a field-oriented drive control, and a modulation unit;
- wherein, via a lookup table of the modulation unit and via the power stage, currents are specified in such a way that, corresponding to a starting value of the power dissipation regulator, maximum power dissipations occur.

11. The auxiliary heating system according to claim 10, wherein the power dissipation monitor is equipped to process parameters of one or more of: the electric motor and of the power stage; measured or estimated temperatures in one or both of the stator and pulse converter of the electric motor; volume flows in the coolant circulation; and currents measured in the electric circuit regulated by the power dissipation regulator.

12. The auxiliary heating system according to claim 10, wherein the motor vehicle is a battery electric vehicle.

13. The auxiliary heating system according to claim 10, wherein the motor vehicle comprises at least one internal combustion engine.

14. The auxiliary heating system according to claim 13, wherein the motor vehicle is a plug-in hybrid vehicle, a hybrid electric vehicle, or a mild hybrid electric vehicle.

15. The auxiliary heating system according to claim 13, wherein the auxiliary heating system is connected to a coolant circulation of an internal combustion engine of the motor vehicle.

* * * * *